United States Patent
Ohl, Jr.

(10) Patent No.: US 8,695,196 B2
(45) Date of Patent: Apr. 15, 2014

(54) METHOD AND SYSTEM FOR DISENGAGING A SHRINK COUPLING ON A TURBINE GENERATOR

(75) Inventor: Richard Arland Ohl, Jr., Hudson, NY (US)

(73) Assignee: General Electric Company, Schenectady, NY (US)

( * ) Notice: Subject to any disclaimer, the term of this patent is extended or adjusted under 35 U.S.C. 154(b) by 421 days.

(21) Appl. No.: 12/951,650

(22) Filed: Nov. 22, 2010

(65) Prior Publication Data
US 2011/0072627 A1   Mar. 31, 2011

Related U.S. Application Data

(62) Division of application No. 12/566,952, filed on Sep. 25, 2009, now Pat. No. 7,836,595.

(51) Int. Cl.
*B23P 19/00*   (2006.01)

(52) U.S. Cl.
USPC ............................ 29/426.5; 29/822; 29/239

(58) Field of Classification Search
CPC ............................ F03D 1/003; B23P 19/042
USPC ........... 29/239, 244, 252, 889.1, 426.5, 426.3
See application file for complete search history.

(56) References Cited

U.S. PATENT DOCUMENTS

| | | | | |
|---|---|---|---|---|
| 1,409,524 A | * | 3/1922 | Chast | 52/711 |
| 3,725,994 A | * | 4/1973 | Wechsler | 29/447 |
| 4,485,542 A | * | 12/1984 | Vasoll | 29/252 |
| 4,567,649 A | * | 2/1986 | Ades et al. | 29/800 |
| 5,129,136 A | * | 7/1992 | Richardson | 29/426.5 |
| 2007/0025840 A1 | | 2/2007 | Weaver et al. | |
| 2008/0199309 A1 | * | 8/2008 | Bagepalli et al. | 415/170.1 |
| 2008/0208520 A1 | | 8/2008 | Noyer et al. | |
| 2008/0296424 A1 | * | 12/2008 | Frangenberg et al. | 241/231 |
| 2010/0009799 A1 | | 1/2010 | Ciszak et al. | |
| 2010/0158661 A1 | * | 6/2010 | Dawson et al. | 415/4.3 |

* cited by examiner

*Primary Examiner* — Alexander P Taousakis
(74) *Attorney, Agent, or Firm* — Dority & Manning, P.A.

(57) ABSTRACT

A system and associated method for disengaging a shrink coupling that secures a shaft to a drive train component, such as a gearbox, includes a reaction plate erected around the shaft at a location displaced from the shrink coupling, with the reaction plate being anchored in place relative to the shaft. A plurality of jacking devices, such as hydraulic jacks, are operationally disposed between the reaction plate and shrink coupling and spaced circumferentially around the shaft. The jacking devices have a first end engaged against the reaction plate and a second opposite end mechanically fastened to the shrink coupling. To remove the shrink coupling from the drive train component, the shrink coupling is released from its clamped state and the jacking devices are activated to exert a pulling force on the shrink coupling, which causes the shrink coupling to be pulled off of the drive train component and moved axially along the shaft to a resting position on the shaft.

8 Claims, 5 Drawing Sheets

METHOD AND SYSTEM FOR DISENGAGING A SHRINK COUPLING ON A TURBINE GENERATOR

CROSS-REFERENCE TO RELATED APPLICATION

The present invention is a Divisional Application of U.S. patent application Ser. No. 12/566,952, filed Sep. 25, 2009.

FIELD OF THE INVENTION

The present invention relates generally to a method and related system for disengaging a shrink coupling, and, more particularly, to removal of a shrink coupling used to couple a main shaft to gearbox in a turbine generator.

BACKGROUND OF THE INVENTION

Shrink couplings (also known as "shrink disks") are widely used in drive trains to couple a rotating shaft to another component, such as a gearbox. In many conventional wind turbine designs, a shrink coupling is used to secure the main drive shaft ("low speed shaft") to the gearbox. This coupling can be quite large, often weighing in the range of about 2,000 lbs, and various maintenance procedures require removal of the shrink coupling. For example, inspection or replacement of the low speed shaft seal (also referred to as the "front seal") in the gearbox can only be accomplished with removal of the shrink coupling.

Modern wind turbines can be quite large, with many designs having a rotor height exceeding 100 meters, and maintenance of these wind turbines often requires the use of a large construction crane in order to repair/replace components in the turbine nacelle. Removal of the main drive shaft shrink coupling is an example of just such a procedure that, to date, typically requires a crane. The logistic requirements, turbine down time, and expense associated with this maintenance procedure can be tremendous.

Wind power is considered one of the cleanest, most environmentally friendly energy sources presently available, and wind turbines have gained increased attention in this regard. However, the cost/benefit economics of wind energy is a constant consideration. The cost of producing the energy, including maintenance of the wind turbines, cannot outweigh the benefits. In this regard, the industry would benefit from improvements or advancements in wind turbine operation and maintenance that would reduce the requirements (and associated expense and logistical burdens) for an on-site crane in the performance of maintenance or repair work on the turbines.

BRIEF DESCRIPTION OF THE INVENTION

Aspects and advantages of the invention will be set forth in part in the following description, or may be obvious from the description, or may be learned through practice of the invention.

Although aspects of the invention will be described herein as they relate to maintenance procedures on a wind turbine, it should be appreciated that this is for purposes of illustrating particular useful embodiments of the present method and system for removal of a shrink coupling. The invention is not limited to wind turbines, and is applicable in any situation that requires removal of a relatively large shrink coupling from between a shaft and another component.

In accordance with aspects of the invention, a method is provided for disengaging a shrink coupling that secures a shaft to a drive train component. The method includes erecting a reaction plate around the shaft at a location axially displaced from the shrink coupling such that the reaction plate is anchored axially in place relative to the shaft. A shim member may be placed around at least a portion of the circumference of the shaft in an axial position between the shrink coupling and reaction plate. A plurality of jacking devices are disposed between the reaction plate and the shrink coupling and are equally circumferentially spaced around the shaft. The jacking devices have a first end engaged against the reaction plate and a second, opposite end in a pull-engagement configuration with the shrink coupling. The shrink coupling is released from its clamped state, and the jacking devices are activated to exert a pulling force on the shrink coupling to pull the coupling off of the drive train component and axially along the shaft to a resting position on the shaft. If used, the shim member is configured so that the shrink coupling remains concentrically aligned with the drive train component in its rest position on the shaft for subsequent re-engagement with the drive train component.

The present invention also encompasses a system for disengaging a shrink coupling that secures a shaft to a drive train component. The system includes a reaction plate erected around the shaft at a location displaced from the shrink coupling and anchored axially in place relative to the shaft. A shim member may be disposed circumferentially around at least a portion of the circumference of the shaft at an axial location between the shrink coupling and the reaction plate. A plurality of jacking devices are operationally disposed between the reaction plate and the shrink coupling. The jacking devices are equally circumferentially spaced around the shaft and have a first end engaged against the reaction plate and a second, opposite end mechanically fastened to the shrink coupling in a pull-engagement configuration. With this system, the shrink coupling can be released from its clamping state and removed from the drive train component by activating the jacking devices, which exert a pulling force on the shrink coupling to pull the coupling off of the drive train component and axially along the shaft to a resting position on the shaft.

The invention also includes a method for performing a maintenance procedure on a front seal of a turbine generator gearbox wherein a drive shaft is coupled to the gearbox with a shrink coupling. The method includes erecting a reaction plate around the drive shaft at a location axially displaced from the shrink coupling. A plurality of jacking devices are disposed between the reaction plate and the shrink coupling, with the jacking devices being circumferentially spaced around the shaft. The jacking devices have a first end that is engaged against the reaction plate, and a second opposite end configured in a pull-engagement configuration with the shrink coupling. The shrink coupling is released from its clamped state and the jacking devices are activated to exert a pulling force on the shrink coupling. The pulling force causes the shrink coupling to be pulled off of the gear box axially along the shaft to a resting position on the shaft. In this manner, access is provided to the front seal for the maintenance procedure. Once the maintenance procedure on the front seal has been performed, the shrink coupling is moved from its rest position on the shaft back into position for securing the shaft to the gearbox by reversing the direction of the jacking devices and moving the shrink coupling axially along the shaft to an operational position on the gearbox. The shrink coupling is then activated into its clamped state.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
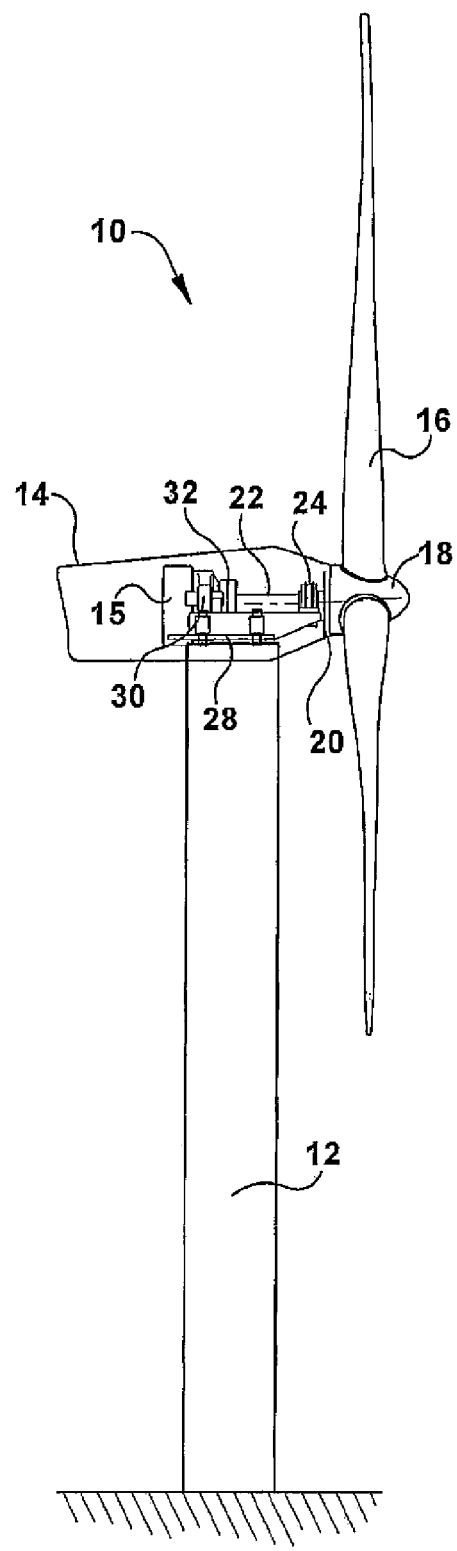
FIG. 1 is a perspective view of a conventional wind turbine.

Reference now will be made in detail to embodiments of the invention, one or more examples of which are illustrated in the drawings. Each example is provided by way of explanation of the invention, and not as a limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of turbine blades 16 are mounted to a rotor hub 18, which is in turn connected to a main flange 20 that turns a main rotor shaft 22. The main rotor shaft 22 is coupled to a gearbox 30 via a shrink coupling 32, which generates a compression fitting between a sleeve 31 (FIGS. 4C and 5A) in the gearbox 30 and the shaft 22. The gearbox 30 is connected to a generator 15 via a high speed shaft (not shown). The blades 16 convert motive force of wind into rotational mechanical energy via the shaft 22 and gearbox 30 to generate electricity with the generator 15.

Figure 2:
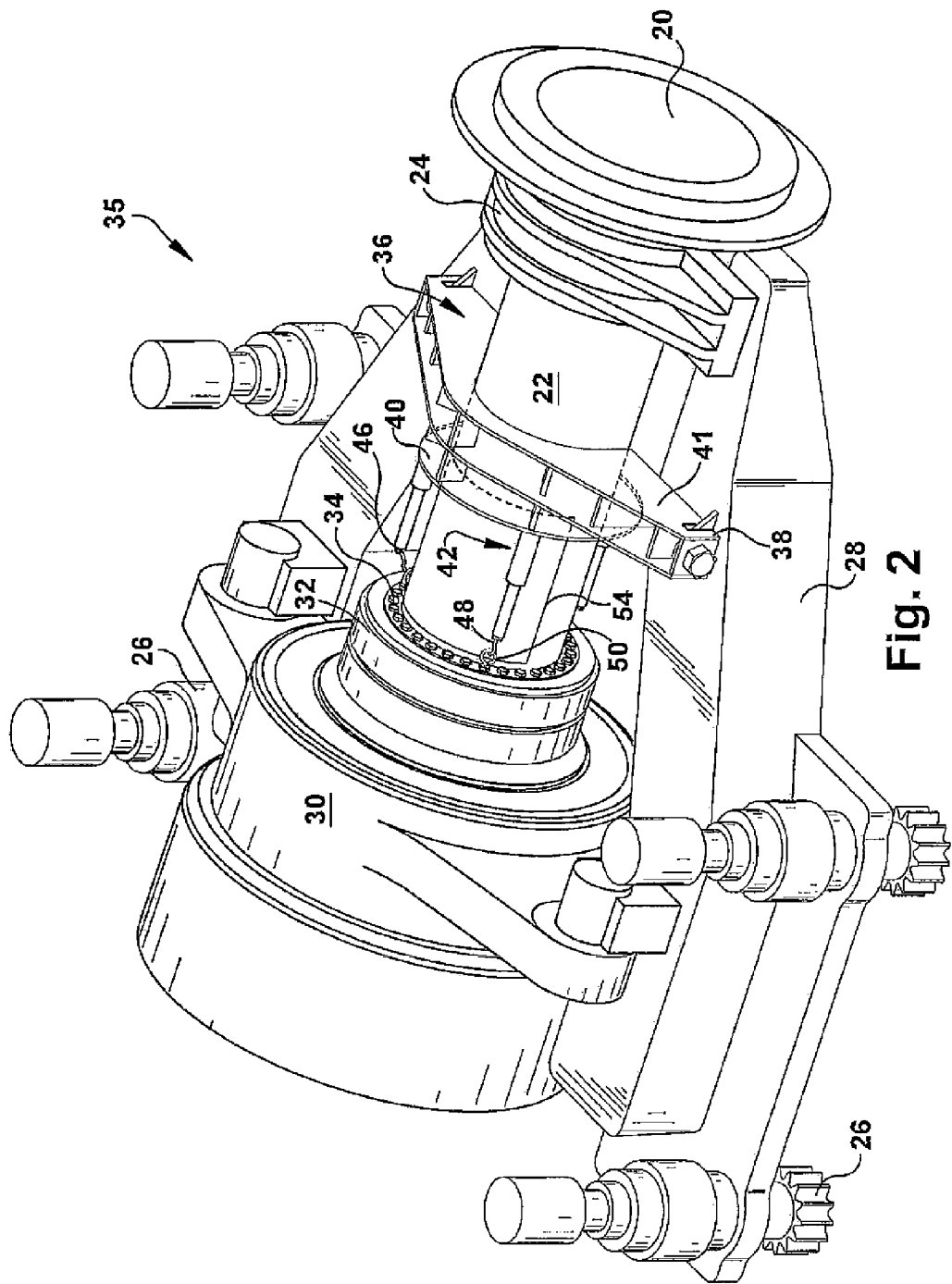
FIG. 2 is a perspective view of an embodiment of a system in accordance with aspects of the invention configured for removal of a shrink coupling from a turbine generator gearbox.

FIG. 2 illustrates components of a wind turbine generator supported by a bedplate 28. As discussed, the bedplate 28 and generator components may be housed within a nacelle 14 (FIG. 1). Briefly, the main rotor shaft 22 is supported by a bearing 24 relative to the bedplate 28. A main flange 20 is attached to the shaft 22 at the forward end thereof and connects with a rotor hub 18 of the wind turbine 10 (FIG. 1). The opposite end of the main rotor shaft 22 is coupled to a gearbox 30 via a shrink coupling 32. In the embodiment illustrated, the shrink coupling 32 is a conventional dual-ring coupling that may be hydraulically actuated. A number of head bolts 34 (which may include jacking screws) are located around a front face of the shrink coupling 32 and are used for installation and actuation of the shrink coupling 32. Operation of shrink couplings 32 is well known by those skilled in the art and a detailed explanation thereof is not necessary for purposes of the present disclosure.

Any number of other components related to the turbine generator drive train or operation of the wind turbine may be configured on the bedplate 28, for example yawl drives 26, control equipment, coolers, and the like. The perspective view of FIG. 2 is provided for illustrative purposes only, and the invention is not limited to any particular type of drive train or other equipment configuration within a nacelle 14 or other structure.

Still referring to FIG. 2, a system 35 in accordance with aspects of the invention is provided for removing the shrink coupling 32 from a drive train component, such as the gearbox 30. The system 35 includes a reaction plate 36 that is erected around the shaft 22 at a location that is axially displaced from the front face of the shrink coupling 32. The reaction plate 36 is anchored relative to the bedplate 28 at anchor locations 38 by any conventional means so that the reaction plate 16 is axially fixed in position relative to the shrink coupling 32. The reaction plate 36 may be formed from a plurality of individual frame members that are mechanically fastened together by any conventional means. In the illustrated embodiment, the reaction plate 36 includes a forwardmost section 41 that extends partially around the circumference of the shaft 22 and is anchored to the bedplate 28 at anchor points 38, and a head plate 40 that extends completely around the shaft 22. The head plate 40 may be connected to the forward section 41 by any conventional means.

A plurality of jacking devices 42 are disposed between the reaction plate 36 and the shrink coupling 32. In the illustrated embodiment, the jacking devices 42 are equally spaced around the circumference of the shaft 42 and have a first end (not visible in FIG. 2) engaged against the head plate 40, and an opposite engagement end 46 configured in a pull-engagement with the shrink coupling 32.

The first end of the jacking devices 42 may be rigidly connected to the head plate 40. In this embodiment, the head plate 40 may be provided in sections with the jacking devices 42 rigidly attached thereto. For example, the head plate 40 may be provided in three circumferential sections, with a jacking device 42 attached to each section. The sections may then be assembled around the circumference of the shaft 22 so that the three jacking devices 42 are equally spaced around the shaft 22.

The engagement ends 46 of the jacking devices 42 may be configured in the pull-engagement with the shrink coupling 32 in various ways. For example, in the illustrated embodiment, the engagement end 46 of the jacking devices 42 includes a hook 48. This hook 48 engages in eye bolts 50 that are substituted for head bolts 34 in the shrink coupling 32. In other words, a plurality of circumferentially equally spaced head bolts 34 may be removed from the shrink coupling 32 and eye bolts 50 threaded into the shrink coupling 32 in place of the head bolts 34. In an alternate embodiment, the engagement end 46 of the jacking devices 42 may include a threaded member that threads directly into the threaded bores in the face of the shrink coupling 32. It should be appreciated that any manner of pull-engagement configuration may be utilized in this regard to mechanically couple the engagement end 46 of the jacking devices 42 with the shrink coupling 32. It should also be appreciated that the eye bolt 50 and hook 48 engagement configuration illustrated in FIG. 2 may be reversed so that the hooks 48 are threaded into bores in the shrink coupling 32, and eye bolts 50 are configured on the engagement ends 46 of the jacking devices 42.

The system 35 may also include a shim member 54 that is provided on the shaft 22 at an axial position between the shrink coupling 32 and reaction plate 36. This shim member 54 may be made from any suitable rigid material that has a shape or physical property so as to conform to the circumference of the shaft 22. In a particular embodiment, the shim member 54 may be modular in nature in that it is formed from a plurality of suitable composite material pieces that are assembled at least partially around the upper circumferential section of the shaft 22. The shim member 54 should be of sufficient rigidity and strength so as to fully support the weight of the shrink coupling 32 on the shaft 22. As described in greater detail below, once the shrink coupling 32 has been removed from the gearbox 30, the coupling 32 is pulled axially onto the shim member 54 to a rest position on the shaft 22. The shim member 54 has a radial thickness such that the shrink coupling 32 is maintained in an aligned concentric relationship with the gearbox 30 (sleeve 31) while at its resting position on the shim member 54 (and shaft 22). In embodiments wherein the shaft 22 has a stepped circumferential contour, the shim member 54 would have a correspondingly shaped stepped profile so that the shrink coupling 32 is maintained in an aligned concentric relationship with respect to the gearbox sleeve 31.

The system 35 is not limited to any particular type of jacking device 42. In a particular embodiment, the jacking devices 42 may be portable hydraulic jacks that are supplied with pressurized hydraulic fluid from a suitable source. For example, in the embodiment wherein the system 35 is utilized within a wind turbine nacelle 14, a portable hydraulic pump, reservoir, and manifold may be brought into the nacelle 14 for this purpose. Desirably, the individual hydraulic jacks 44 are supplied from a common manifold header to ensure that the jacks are equally pressurized.

It is desirable that the jacking devices 42 are reversible in operational direction so that the same jacking devices 42 may be used to subsequently re-attach the shrink coupling 32, as described in greater detail below.

Figure 4:
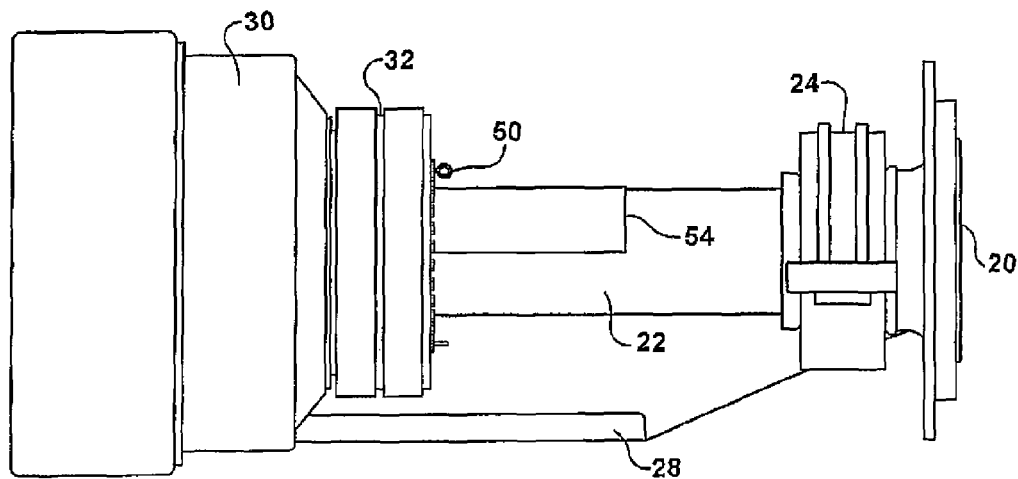
FIGS. 4 through 6 are sequential operational views of a process for removing a shrink coupling from a turbine generator gearbox in accordance with the invention; and, FIGS. 7 through 9 are sequential operational views of a process for subsequent re-attachment of a shrink coupling onto a turbine generator gearbox.
Figure 5:
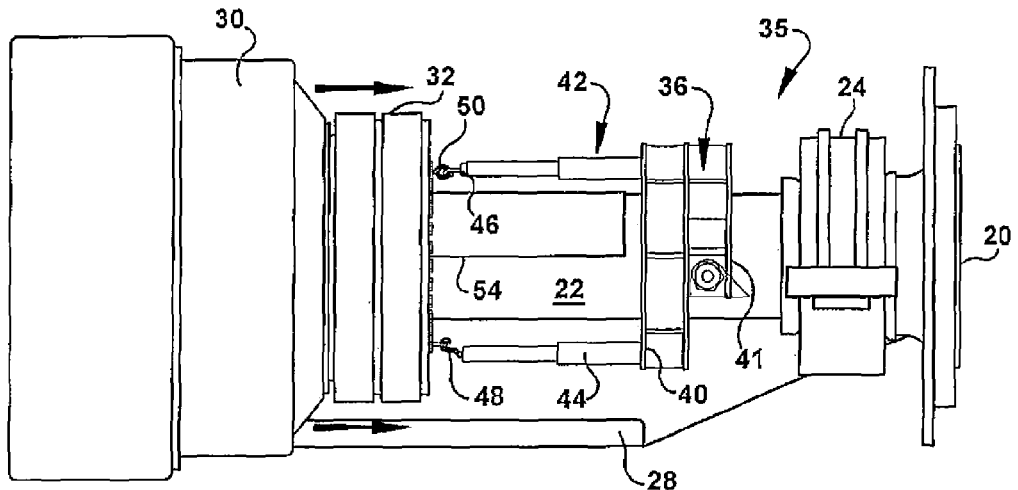
Figure 6:
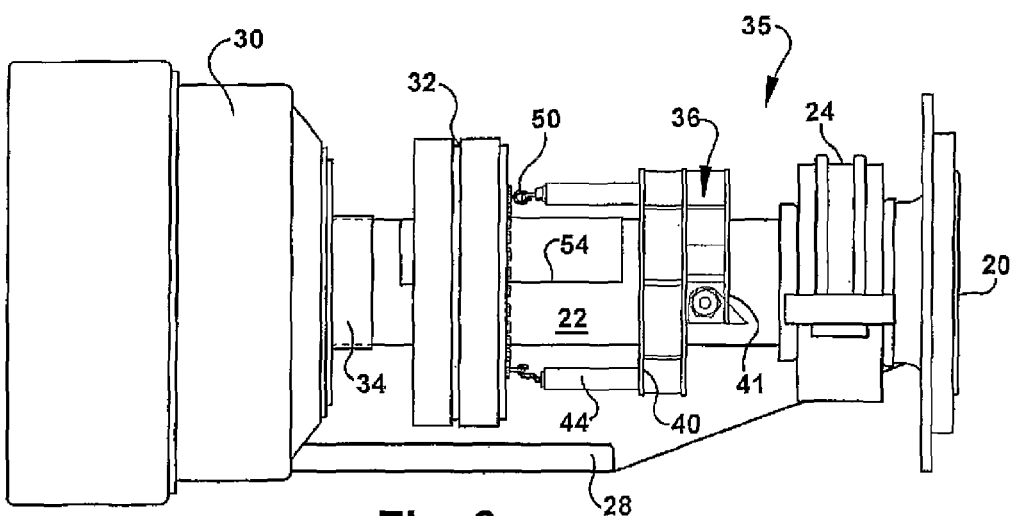

FIGS. 4 through 6 are sequential operational views of the system 35 being used to remove the shrink coupling 32 from a turbine generator gearbox 30. FIG. 4 illustrates initial preparation of the gear train components. In particular, certain of the head bolts 34 in the shrink coupling 32 have been removed and replaced with eye bolts 50. Also, the shim member 54 has been assembled around at least a portion of the circumference of the main rotor shaft 22. It should be appreciated that it is not necessary to assemble the shim member 54 completely around the shaft 22. The shim member 54 is used to support the shrink coupling 32 on a shaft 22 in concentrically aligned relationship with the gearbox sleeve 31 and, in this regard, need only extend partially around the shaft 22, for example about halfway around the shaft 22.

FIG. 5 illustrates the system 35 after the reaction plate 36 has been assembled and anchored axially in position relative to the shrink coupling 32 at anchor points 38. The jacking devices (hydraulic jacks 44 in this embodiment) are equally spaced around the head plate 40 and hooks 48 at the engagement end 46 of the hydraulic jacks 44 are engaged with the eye bolts 50. At this stage, the shrink coupling 32 has been released from its clamped state by conventional means. The hydraulic jacks 44 are then actuated to apply a pulling force on the shrink coupling 32 in the direction of the arrows indicated in FIG. 5. The shrink coupling 32 is controllably pulled from the gearbox sleeve 31 to a resting position on the shim 54 (and shaft 22) as illustrated in FIG. 6. The shrink coupling 32 may remain in this position while any manner of maintenance procedure is performed on the gearbox 30.

Once maintenance procedures are completed on the gearbox 30, the shrink coupling 32 may be re-attached utilizing the system 35. This process is conceptually illustrated in the sequential views of FIGS. 7 through 9. The jacking devices (hydraulic jacks 44 in this embodiment) are configured in a push-engagement at the engagement end 46 with the shrink coupling 32 and are reversed in direction as indicated by the arrows in FIG. 7. The shrink coupling 32 is maintained in an aligned concentric relationship with respect to the gearbox sleeve 31 and, thus, can be mechanically pushed into the sleeve 31 by the action of the hydraulic jacks 44, as illustrated in FIG. 8. At this stage, the shrink coupling 32 may be actuated to its clamped configuration by conventional means, and the system 35 removed from the drive train components, as depicted in FIG. 9.

Figure 3:
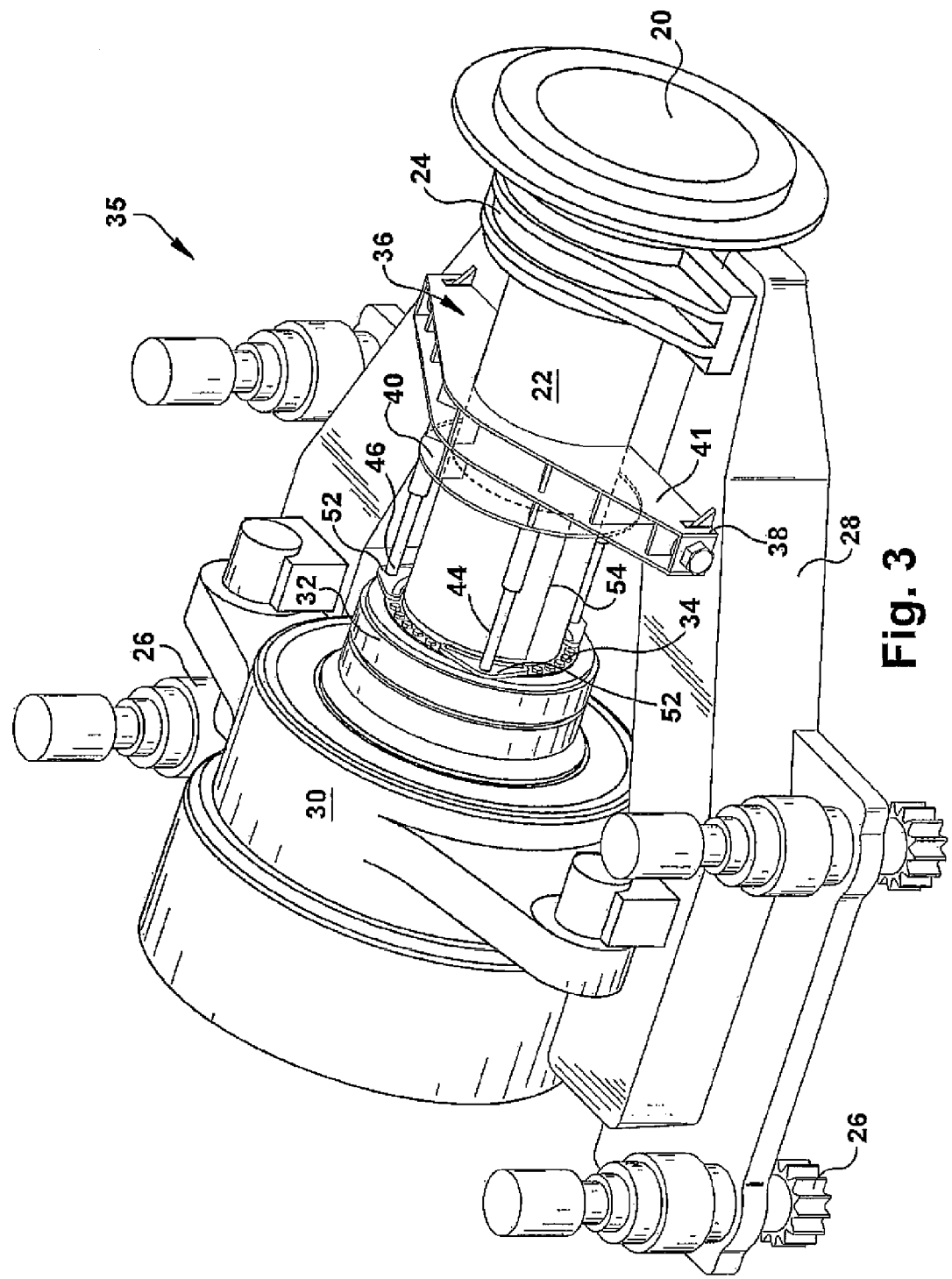
FIG. 3 is a perspective view of an alternate embodiment of a system in accordance with aspects of the invention configured for subsequent re-attachment of a shrink coupling on a turbine generator gearbox.
Figure 7:
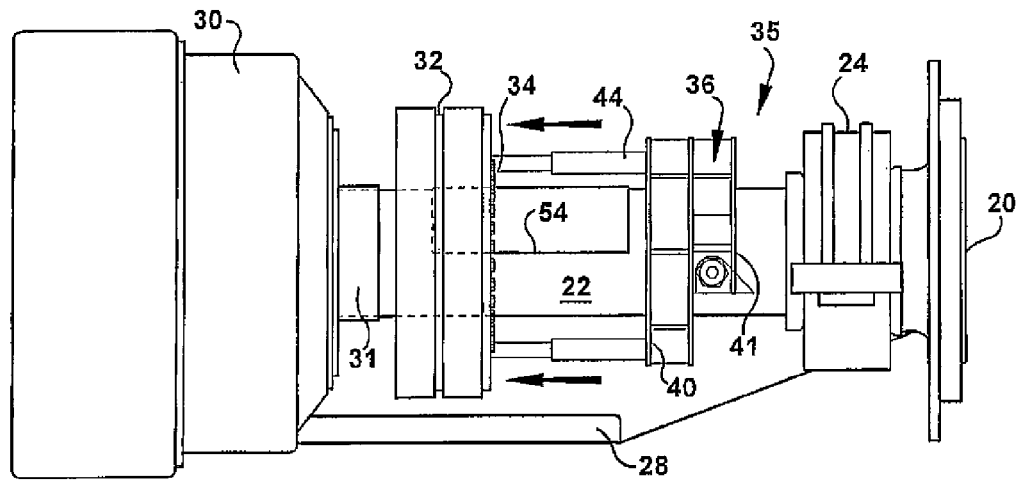
Figure 8:
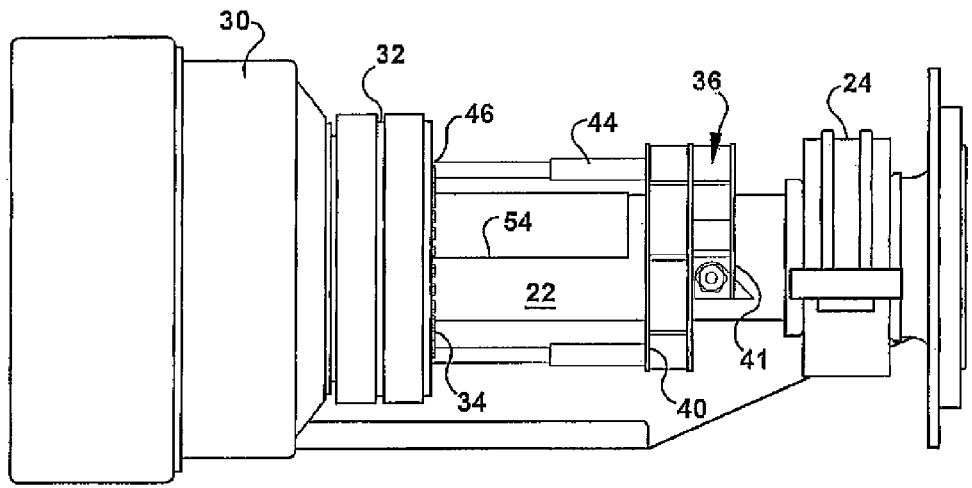
Figure 9:
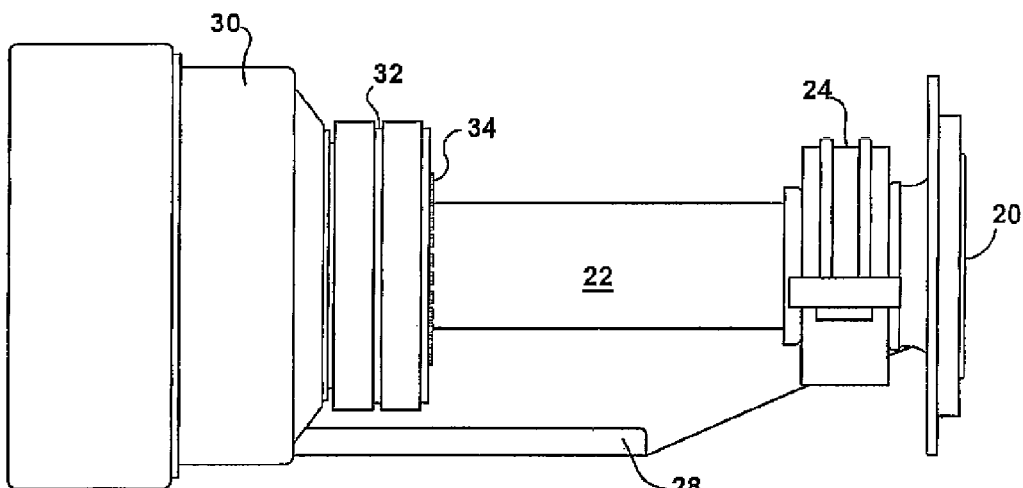

FIG. 3 is similar to the view of FIG. 2 but illustrates a particular type of push-engagement configuration at the ends 46 of the jacking devices 42 that may be useful for re-attaching the shrink coupling 32 in the procedure illustrated in FIGS. 7 through 9. In this embodiment, the hooks 48 have been removed from the engagement ends 46 and a push plate 52 substituted therefore. Also, the eye bolts 50 have been removed from the shrink coupling 32 and replaced with the appropriate head bolts 34 or jacking screws. In this embodiment, the push plates 52 simply engage against the head bolts 34 and axially push the shrink coupling 32 into engagement with the gearbox 30. It should be appreciated, however, that any other manner of push-engagement configuration between the jacking devices 42 and front face of the shrink coupling 32 may be utilized for this purpose.

The present invention also encompasses a method for removing a shrink coupling in accordance with certain aspects discussed above. The method includes, for example, erecting a reaction plate around the shaft at a location displaced from the shrink coupling, and anchoring the reaction plate axially in place relative to the shaft. A plurality of jacking devices are disposed between the reaction plate and the shrink coupling, and are equally circumferentially spaced around the shaft. The jacking devices have a first end that is engaged against the reaction plate, and a second opposite end that is in a pull-engagement configuration with the shrink coupling. The shrink coupling is released from its clamped state and the jacking devices are actuated to exert a pulling force on the shrink coupling. The shrink coupling is pulled off of the drive train component and moved axially along the shaft to a resting position on the shaft.

The method may also include providing a shim member around at least a portion of the circumference of the shaft at a location axially between the shrink coupling and the reaction plate. The shrink coupling is pulled onto the shim member in its resting position on the shaft. The shim member is constructed to have a radial thickness such that the shrink coupling is maintained in an aligned concentric relationship with the drive train component at its resting position on the shim member.

The method may further include erecting the reaction plate around the main drive shaft from a plurality of individual frame members. This method may be particularly useful in practice of the method within a relatively confined nacelle of a wind turbine, wherein individual components of the reaction plate would need to be brought into the turbine nacelle and subsequently erected.

The method may further include moving the shrink coupling from its rest position on the shaft back into an operational position on the drive train component by reversing the direction of the jacking devices and moving the shrink coupling axially along the shaft to its final operational position. At this stage, the shrink coupling can be actuated to its clamped state and any devices used in the method removed from the drive train components.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A system including a shrink coupling configured with a removal device, said system comprising:
    a shrink coupling fitted onto a drive train shaft to secure a drive train component to said shaft;
    a reaction plate erected around said shaft at a location displaced from said shrink coupling, said reaction plate anchored in place relative to said shaft;
    a plurality of jacking devices operationally disposed between said reaction plate and said shrink coupling, said jacking devices equally circumferentially spaced around said shaft and having a first end engaged against said reaction plate and a second opposite end mechanically fastened in a pull-engagement configuration to said shrink coupling; and
    whereby to remove said shrink coupling from said drive train component, said shrink coupling is released from a clamped state and said jacking devices are activated to exert a pulling force on said shrink coupling until said shrink coupling is pulled off of said drive train component and moved axially along said shaft to a resting position on said shaft.

2. The system of claim 1, further comprising a shim member disposed circumferentially around at least a portion of said shaft at an axial location between said shrink coupling and said reaction plate such that said shrink coupling is pulled onto said shim member in the resting position of said shrink coupling on said shaft, said shim member having a radial thickness such that said shrink coupling is maintained in an aligned concentric relationship with said drive train component at the resting position of said shrink coupling on said shaft.

3. The system of claim 1, wherein said system is configured within a wind turbine nacelle, said shaft comprising a main drive shaft and said drive train component comprising a gearbox, said reaction plate anchored to a bedplate in said wind turbine nacelle.

4. The system of claim 3, wherein said jacking devices comprise hydraulic jacks.

5. The system of claim 4, wherein said reaction plate comprises a plurality of separate frame members having a size and configuration so as to be moved into said wind turbine nacelle and constructed around said main drive shaft.

6. The system of claim 1, further comprising a plurality of threaded engagement members that are threaded into equally circumferentially spaced bolt holes in a front face of said shrink coupling, said second end of said jacking devices comprising a complimentary engagement member that engages with said threaded engagement members in a pull-engagement configuration.

7. The system of claim 6, wherein said threaded engagement members comprise one of a hook or an eye, and said second end of said jacking devices comprises a complimentary eye or hook, respectively.

8. The system of claim 1, wherein said jacking devices are reversible and said second end of said jacking devices are configurable into a push-engagement with said shrink coupling, whereby said shrink coupling is movable from its rest position on said shaft back into position for securing said shaft to said drive train component by reversing the direction of said jacking devices and moving said shrink coupling axially along said shaft and into an operational position on said drive train component.

* * * * *